Sept. 3, 1935. H. S. JOHNS 2,013,242
CONVEYING MECHANISM
Filed May 12, 1934 4 Sheets-Sheet 1
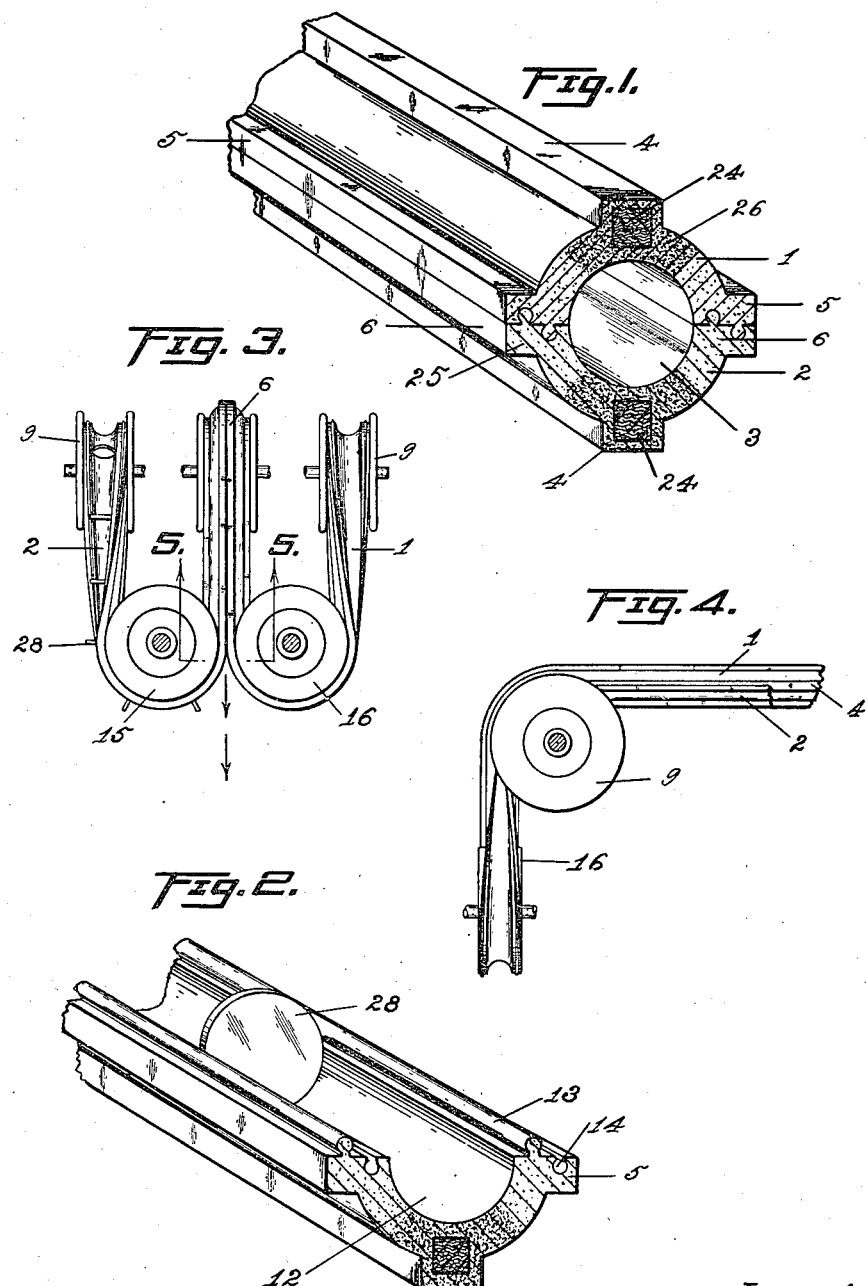
Inventor
Henry S. Johns Sept. 3, 1935. H. S. JOHNS 2,013,242
CONVEYING MECHANISM
Filed May 12, 1934 4 Sheets-Sheet 2
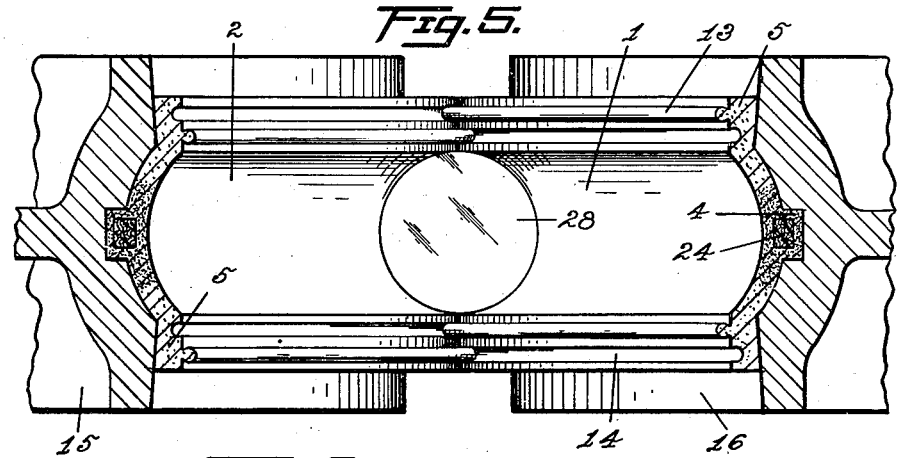
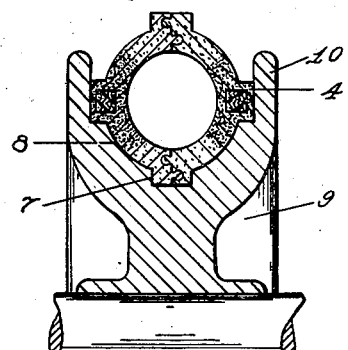
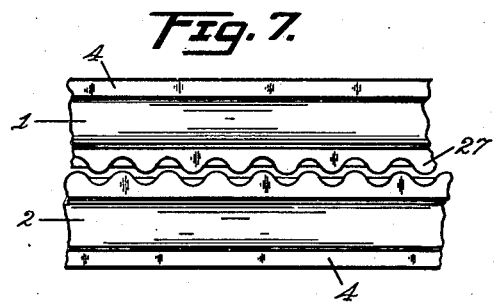
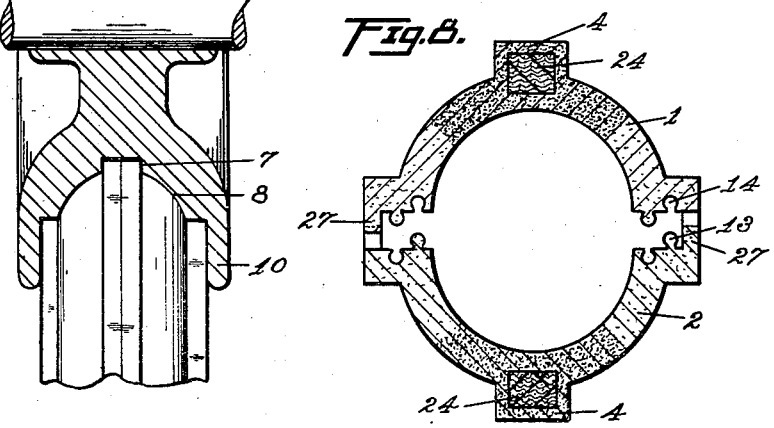
Inventor
Henry S. Johns
by Sept. 3, 1935.  H. S. JOHNS  2,013,242
CONVEYING MECHANISM
Filed May 12, 1934  4 Sheets-Sheet 3
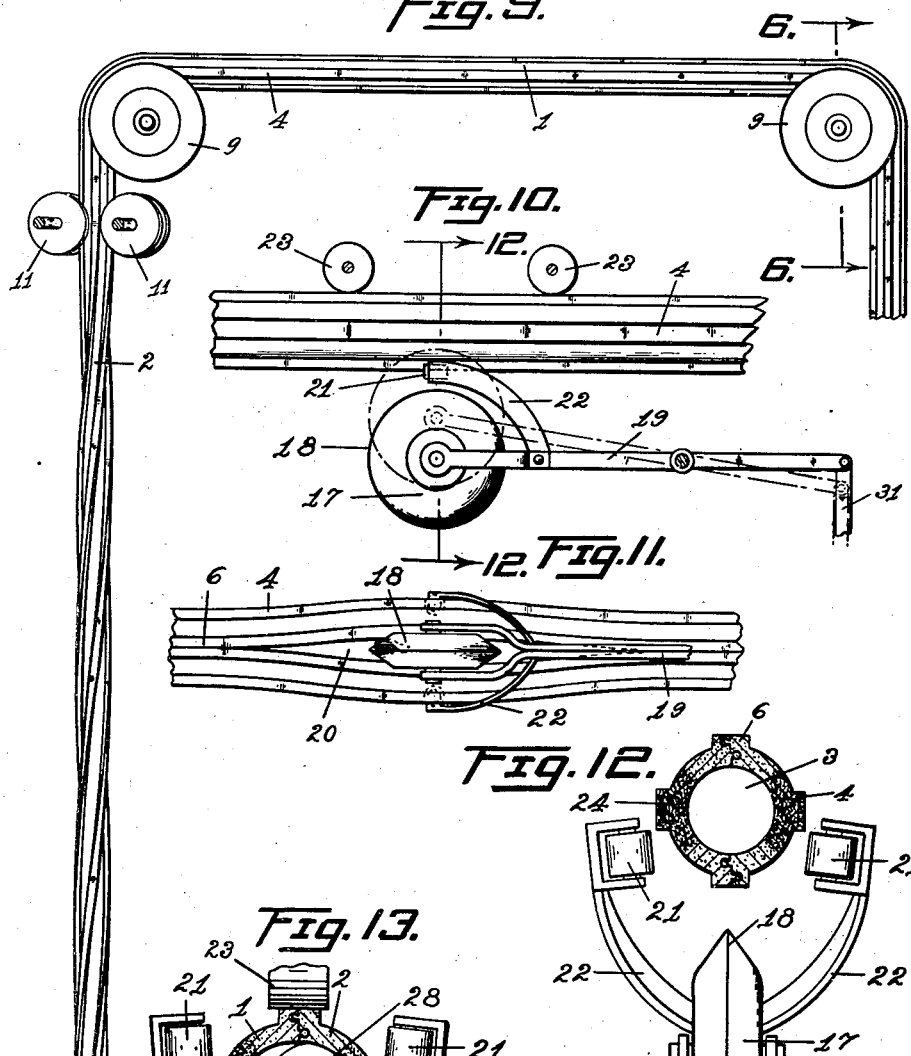
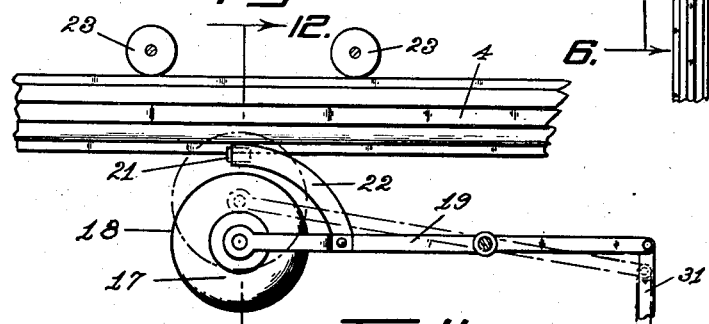
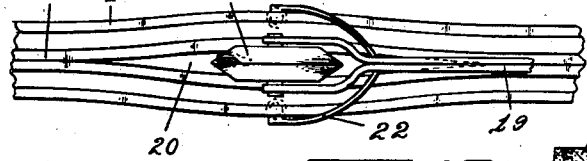
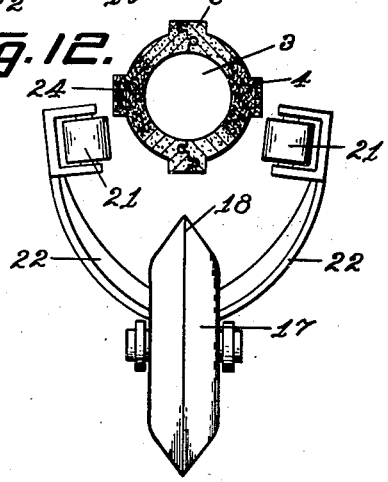
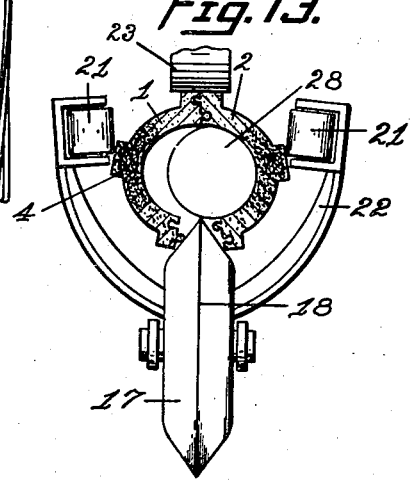
Inventor
Henry S. Johns Sept. 3, 1935.  H. S. JOHNS  2,013,242
CONVEYING MECHANISM
Filed May 12, 1934  4 Sheets-Sheet 4
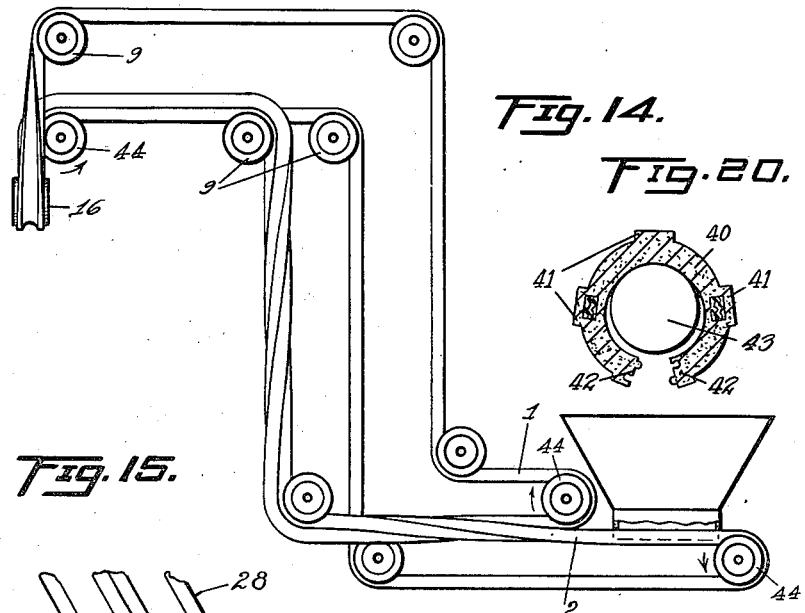
Fig. 14.
Fig. 20.
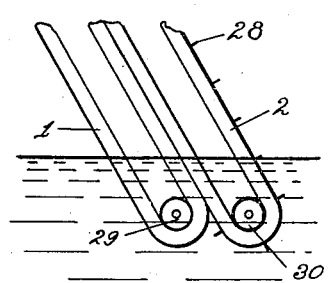
Fig. 15.
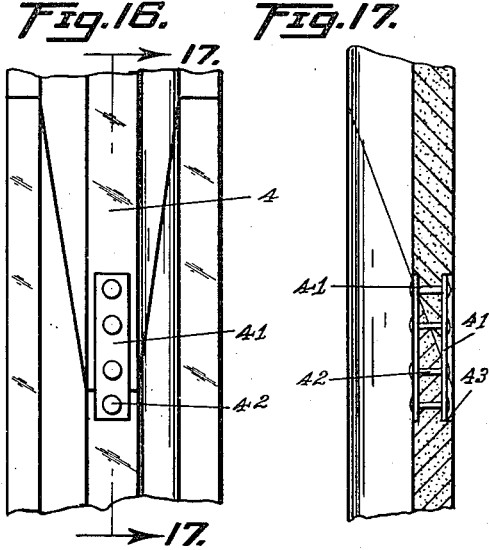
Fig. 16. Fig. 17.
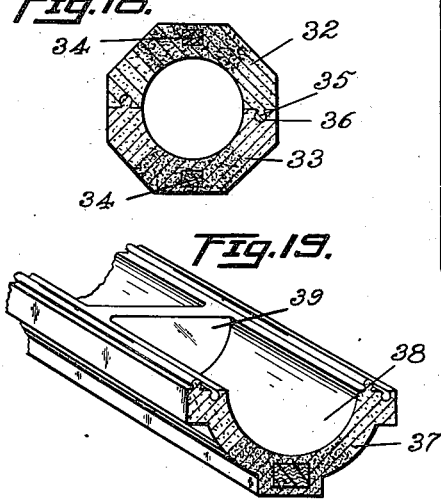
Fig. 18.
Fig. 19.
Inventor
Henry S. Johns Patented Sept. 3, 1935

2,013,242

UNITED STATES PATENT OFFICE 2,013,242

CONVEYING MECHANISM

Henry Stinson Johns, North Grimsby Township, Lincoln County, Ontario, Canada, assignor to Bancroft Holdings Limited, Hamilton, Ontario, Canada, a joint-stock company of Ontario, Canada Application May 12, 1934, Serial No. 725,281

40 Claims. (Cl. 198—162)

My invention relates to improvements in conveyors and is a continuation in part of my patent application Serial Number 615,662 filed June 6th, 1932. The object of my invention is to provide a conveyor which substantially consists of a moving tube and comprises a pair of flexible conveying belts which run face to face, and are formed with grooves or troughs, wherein the conveyed material is carried.

A further object of my invention is to form my belts of a flexible and pliable material such as rubber, and also to furnish fabric cores moulded within the belts, to substantially retain them against longitudinal stretch.

Another object of my invention is to form each of the belts of two grades of rubber, wherein substantially soft pliable rubber constitutes the belt edges and a tougher grade of rubber forms those portions of the belts which surround the fabric. The pliable rubber portions are more flexible to permit the distortional requirements in various belt positions as shall be hereinafter explained, and the tougher rubber retains the belts against over-distortion.

A further and very particular object of my invention, is to twist the moving tube formed by the face to face belts, so that in certain portions of its travel it is of substantially rope form, whereby the belts are securely held together and mutually support each other.

Another object of my invention is to carry the tube formed by the belts over an arrangement of pulleys and to so twist the belts that they run upon their edges in passing over corner pulleys, whereby they both have the same speed of movement in making a turn.

A further object of my invention is to provide a movable wedge element which is positioned underneath the moving tube and adapted to move upwardly, whereby it enters between the lower face to face portions of the belts and in moving them apart permits contained material to discharge, and another object of my invention is to provide a tongue and groove construction upon the abutting faces of the belts on each side of the material carrying the grooves, and also in cases where it is necessary, to furnish teeth or other means for retaining the belts against longitudinal movement independently of each other.

With the foregoing objects in view, as well as others, which will hereinafter appear, the invention comprises the construction, arrangement and combination of my conveyor belts as shall be hereinafter described, it being understood that the disclosure herein is merely illustrative and not specific in a limiting sense.

In the accompanying drawings forming part of this specification;

Fig. 1 is a perspective view of a fragmentary portion of my moving tube conveyor formed by two grooved belts.

Fig. 2 is a similar view of Fig. 1 showing one of the belts.

Fig. 3 is a front elevational view of an assembly of belts and pulleys showing the belts carried over one pulley as a moving tube, and then leaving each other in passing around other pulleys whereby a material discharge is formed.

Fig. 4 is a side elevational view of the assembly shown in Fig. 3.

Fig. 5 is an enlarged view of fragmentary portions of two pulleys and the belts carried thereover, such view being taken through the line 5—5 Figure 3.

Fig. 6 is a cross-sectional view through one of my belt pulleys showing a pair of my belts carried thereon.

Fig. 7 is a side elevational view of a pair of my belts in an alternate construction, wherein the abutting faces are formed in their edge portions with inter-engaging teeth for retaining the belts against longitudinal movement in respect to one another.

Fig. 8 is an enlarged cross-sectional view taken through the belts shown in Figure 7.

Fig. 9 is a side elevational view of the moving tube formed by my pair of belts, one portion thereof being twisted into substantially rope-like form.

Fig. 10 is a side elevational view of a fragmentary portion of the moving tube formed of the pair of belts, together with a movable wedge disc which is adapted to engage and move the belts apart to constitute a discharge opening.

Fig. 11 is an inverted plan view of the assembly shown in Figure 10, the wedge disc being shown entered between the belts.

Fig. 12 is an enlarged cross-sectional view taken through the line 12—12 Figure 10.

Fig. 13 is a similar view to Figure 12, showing the wedge disc inserted between the lower portions of the belts.

Fig. 14 is a schematic view of a conveyor assembly, showing two endless conveyor belts running face to face, the lower belt at the feeding end being extended beyond the upper belt to receive material from a hopper, and the delivery end of the conveyor formed substantially as shown in Figure 3.

Fig. 15 is a schematic view of the lower ends of a pair of my conveying belts immersed in liquid to constitute a pump.

Fig. 16 is a bottom elevational view of the joined ends of a fragmentary portion of one of my belts, showing a pair of joint link plates which may be used.

Fig. 17 is a vertical cross sectional view through the belt joint, being taken through the line 17—17, Figure 16.

Fig. 18 is a cross-sectional view through an alternate form of my conveyor tube, wherein the tube is of octagonal shape.

Fig. 19 is a perspective view of a section of my belt showing a form wherein the partitions have their tops substantially flush with the face of the belt, and Fig. 20 is a cross-sectional view through an alternative construction wherein I use an integral split tube instead of a pair of belts.

Like characters of reference indicate corresponding parts in the different views of the drawings.

The pair of belts forming the moving conveyor tube are endless as schematically shown in Figure 14 and are adapted to run face to face as shown in the other views of the drawings. Each of the complementary belts, 1 and 2, is of substantially semi-circular trough form and when in a face to face position, enclose and form a material carrying bore 3. The outer portions of the belts can be of any suitable form, as for example, the two belts may form a tube of polygon cross section, or, in certain cases may even be of outwardly cylindrical form.

In my drawings, however, I show my preferred form of belt, wherein each belt is formed with a centrally positioned longitudinal rib 4 and a pair of edge flanges 5 wherein the complementary flanges of the two belts form a pair of ribs 6 each of the same dimensions as a rib 4.

The ribs 4 and 6 of the moving tube formed by the pair of belts, are adapted to be received within inner grooves 7, formed in the bottoms of grooves 8 in belt supporting pulleys 9. The grooved portions of the pulleys 9 are of substantially the same cross-sectional shape as the outer contour of one of the belts, or the contour of substantially half of the tube, as will be clearly seen upon reference to Figure 6. The pulley 9 in this figure is formed with flanges 10 which project beyond the ribs 4 as an additional retaining means to prevent the moving tubes or belts from twisting out of place when passing over the pulley.

It will be readily appreciated that in order to prevent the generation of frictional heat within the moving tube formed of the two complementary belts, that it is necessary to have such belts travelling at substantially the same speed all the time that they are in engagement with one another, and that, if the pair of belts were partially carried around a pulley, one above the other, the outer belt riding upon the belt in contact with the pulley would have to travel a greater distance in passing around the pulley, and therefore, at a greater speed, with the subsequent generation of frictional heat. In order to obviate this generation of heat, I carry the two belts, 1 and 2, around, or partially around any change of direction pulleys upon what I call their edges. In other words, the rib 6 formed by the flanges 5, is carried within the pulley groove 7. In this manner both belts have the same path in their passage over the pulley and consequently retain the same speed of movement.

In order to prevent contained material or fluids from escaping between the abutting faces of the complementary belts, I furnish any suitable type of tongue and groove construction between the edges of the belt grooves 12, and the edges of the flanges 5. In the construction shown in the drawings, I form each portion with a tongue 13 and a groove 14, both the tongue and groove being of substantially circular cross-section and of substantially the same size. The tongues in one belt are adapted to enter the grooves in the other belt. Although the entrances to the grooves are normally of less width than the maximum width of the tongues, it will be seen upon reference to Figure 5 that when the belts are individually carried around pulleys in the manner illustrated, that the stretching movement of the outer portions of each belt causes the tongues to narrow in cross-sectional width, and the grooves to widen at their outer portions, so that when a belt is carried over a pulley it will readily come into tongue and groove engagement with another belt. When the belts so engaged pass away together from the pulley, the tongues and grooves restore themselves to their normal dimensions and securely lock one with another.

To retain the belts against elongation, which would be inavoidable with a belt solely made of rubber, I mould a fabric portion or core 24 in each belt in the vicinity of its rib 4, and while such fabric core does not interfere with the cross-section or transverse distortion of the belt, it retains the belt against stretching. I preferably form my belts of two grades of rubber, a soft pliable grade of rubber forming the outer edge portions 25 of the belts and a harder or tougher grade of rubber forming the central or rib 4 containing portions of the belts. By this construction the outer softer portions of the belts are sufficiently flexible and pliable to permit the necessary distortions in twisting the belts and still retaining them in engagement with one another, and the tougher portions 26 of the belts are sufficiently non-elastic to prevent over distortion.

In Figure 9 of the drawings, wherein I have shown my pair of belts positioned in twisted form vertically and carried horizontally over a pair of pulleys 9, I also show a pair of pulleys 11 which are positioned to engage the upper end of the twisted belt as it approaches the pulley 9 to guide the belts into the required edge-wise position in passing over such pulley. Although the pulleys 11 are not absolutely necessary in all installations, they provide a safeguard against belt displacement.

In the utilization of my belts 1 and 2 to form a vertically moving tube, as illustrated in Figure 9, I twist the tube so formed, into rope like form, whereby the pair of complementary belts are tightly held together as an additional security against leakage, giving a certain stiffness to the tube, and one of the most important reasons, for enabling one belt to support the other in their combined strength for supporting the contained material being conveyed. The material in my moving tube conveyor can be discharged therefrom by separating the belts by a suitable arrangement of pulleys, as for example, the pair of pulleys 15 and 16 in Figure 3 wherein the belt 1 is carried away from the belt 2 over the pulley 16 and the belt 2 carried away from the belt 1 over the pulley 15. The material is dropped as indicated by the arrows. Many variations of this type of discharge can, of course, be evolved to meet various constructional situations.

In Figures 10 to 13, I show another form of discharge, whereby the contained material can be discharged from a travelling pair of belts at any desired point or points. In this case, I provide a freely mounted disc 17 which is formed with a wedge edge 18. This disc is vertically positioned underneath a tube section, wherein the belts are running side by side with their abutting faces in a substantially vertical position. The disc is freely rotatable upon any suitable type of movable member, such as the swingable arm 19. When the disc carrying end of the arm 19 is moved upwardly by any suitable means, as for example under the influence of the link connection 31, the wedge edge 18 of the disc enters between the abutting faces of the lower portions of the belts and in its continued upward movement moves such lower portions apart as illustrated in Figure 12.

In this manner a discharge opening 20 is formed in the lower portion of the tube about the disc 17, and when the belts move away from the disc in their travel, they close together again under their own tension. For retaining the belts from becoming completely apart during the insertion of the disc 17, I provide a pair of rollers 21 which are spaced apart substantially the same distance as the width of the tube and are carried upon a pair of upwardly extending arms 22 projecting from the arm 19. The function of these two rollers will be clearly seen upon Figure 12, in that they hold the upper portions of two belts together. In order to retain the tube from lifting up under the pressure of the upward movement of the opening disc 17, I furnish a pair of retaining rollers 23, engaging the upper portion of the tube in the vicinity of the disc 17.

In Figures 7 and 8, I show a pair of my belts formed with integral teeth members 27 in their edge portions, such teeth being adapted to interengage one another and thus retain the belts against independent longitudinal movement in cases where it is so desired. For example, if my belts were used for moulding purposes it would be essential that there be no movement of one belt independently of the other. In Figures 7 and 8, the two belts are shown slightly apart in order to more clearly illustrate the teeth.

For actuating my conveyor belts in an assembly, some of the pulleys over which the belts are carried are power driven, the other pulleys being freely mounted. For example, in Figure 14, the pulleys 9 are freely mounted, while the pulleys 44 are power driven in the directions indicated by the arrows.

In cases where it is desired to convey certain types of material in a substantial vertical direction, I form the material carrying belt grooves 12 with a series of partitions 28 for the purpose of holding the conveyed material against slippage, and while I have shown such partitions in several figures of my drawings, it is to be understood that they are not essential except in the conveying of certain types of loosely packed material where the tube is moving at a comparatively slow speed, or in the utilization of my tube as a pump for elevating fluids from one level to another as shown in Figure 15. In this construction, as illustrated, the lower portions of the belts 1 and 2 are immersed in the fluid and carry over a pair of submerged pulleys 29 and 30, and their discharge ends, not shown, carried over any suitable pulley arrangement, as for example that illustrated in Figures 3 and 4.

Figure 18 shows an alternative form of my conveyor tube, wherein the pair of belts 32 and 33 form a tube of octagonal shape, each of the belts containing a fabric core 34. A tube of this shape, or any similar shape, is carried over suitably grooved pulleys and is also susceptible to be twisted and arranged in the same manner as my preferred form of tube. I also show this form of belt with single tongues and grooves 35 and 36 instead of the double tongues and grooves, as shown in my preferred form. I, however, find that the provision of the multiple tongues and grooves on the sides of the belts is more practical than the use of the single tongue and groove form, in that a belt having a groove in one side and a tongue on the other side, has, of course, more rubber on one side than the other, with a consequent uneven resiliency. The use of multiple tongues and grooves on each side of the belt keeps the rubber content even.

In Figures 16 and 17 I show the joined ends of one of my belts. The belt ends are cut with inclined faces 40 which can be either vulcanized together, or stuck together and reinforced with recessed flexible metal link plates 41. The link plates are joined by screws or rivets 42 which extend through the plates and also through the belt ends, one plate being recessed in the bottom of the belt trough 12 and the other plate contained in a recess 43 in the outer face of the belt.

Figure 19 shows one of my belts 37 wherein its groove 38 is provided with partitions, having their tops substantially flush with the top of the belt, one of such partitions 39 is shown in the drawings. This form of belt has been found advantageous under certain conditions where it is desired not to have the partitions 28 projecting.

Referring again to Figures 3 and 4 wherein one of my forms of discharge assembly is shown, it will be apparent that by turning this assembly upside down, and the belts run in the opposite direction, that such assembly can be used as a material feed. The material in this case would be delivered into the tube bore formed by the two belts.

I have found, in practice, that my moving tube conveyor operates very satisfactorily in the conveying of liquids and plastic masses, as well as granular material, and while I show my belts as provided with partitions, my invention will function with a smooth uninterrupted tube bore under many conditions and particularly at higher speeds.

In Figure 20, I show an alternative construction wherein I employ a tube 40 which has the same function as my pair of belts. The tube has the same exterior form as my pair of belts shown in Figure 1, in that it is provided with ribs 41 corresponding to the ribs 4 and a pair of flanges 42 which are equivalent to the flanges 5 and together form a rib. The tube can also be formed with a series of spaced apart partitions 43. The tube is opened for material feeding and delivery purposes by the use of a wedge disc such as shown in Figures 10 to 13. For feeding, the split portion of the belt is uppermost with the disc wedge 17 on top, and for discharging, the tube and disc are in the same position as illustrated in Figure 13. The ribs 41 and the pair of flanges 42 function in keeping the tube in position upon its supporting pulleys, as previously described in connection with the pair of belts. This tube is also adapted to be twisted into rope-like form in the same manner as the pair of belts illustrated in Figure 9.

Certain of the claims in this application are directed to divisible subject matter disclosed but not claimed in Patent No. 1,851,910 of Henry S. Johns.

Although I have illustrated and described several particular embodiments of my invention, it is to be understood that the drawings and the description are illustrative of the underlying principles of the conveyor or pump and that I may make such changes and alterations as I may from time to time deem necessary without departing from the spirit of my invention as set forth in the appended claims.

What I claim as my invention is:

1. A conveying mechanism comprising a pair of rubber-like belts adapted to travel in face to face contact with each other and having material carrying cavities in their contacting faces, and a tongue and a groove formed in each side of the contacting face of each belt between and spaced away from the cavities and the edges of the belts.

2. A conveying mechanism comprising a pair of rubber-like belts adapted to travel in face to face contact with each other and having material carrying cavities in their contacting faces, substantially non-stretchable cores embedded in the belts underneath the bottom of the cavities, and a tongue and groove formed in each side of the contacting face of each belt between and spaced away from the cavities and the edges of the belts.

3. A conveying mechanism comprising a substantially exteriorly round moving tube formed of a pair of belts flexible in all directions along their length and in contact with each other and having grooves in their contacting faces whereby the bore of the tube is formed, grooved pulleys supporting the belts and a plurality of substantially equi-distantly spaced apart pulley engaging ribs protruding from the tube and running longitudinally thereof.

4. A conveying mechanism comprising a substantially exteriorly round moving tube formed of a pair of belts flexible in all directions along their length and in contact with each other and having grooves in their contacting faces whereby the bore of the tube is formed, a plurality of substantially equi-distantly spaced apart ribs protruding from the tube and running longitudinally thereof, and substantially non-stretchable cores embedded in the belts interiorly of the ribs.

5. A conveying mechanism comprising a substantially exteriorly round moving tube formed of a pair of endless rubber-like belts in contact with each other and having grooves in their contacting faces whereby the bore of the tube is formed.

6. A conveying mechanism comprising a substantially exteriorly round moving tube formed of a pair of endless rubber-like belts in contact with each other and having grooves in their contacting faces whereby the bore of the tube is formed, and a plurality of spaced apart pulleys upon which the tube is supported and around which it partially extends with the belts in a side by side position and both in contact with the pulleys.

7. A conveying mechanism comprising a plurality of spaced apart pulleys, a pair of rubber-like belts in contact with each other and having grooves in their contacting faces, said belts constituting a moving tube which is supported by the pulleys, sections of the tube between pulleys being twisted into rope-like form.

8. A conveying mechanism comprising a pair of rubber-like belts adapted to travel in face to face contact with each other and having material carrying cavities in their contacting faces, and a plurality of spaced apart pulleys between which the belts extend, said belts being twisted into rope-like form between pulleys.

9. A conveying mechanism comprising a pair of rubber-like belts adapted to travel in face to face side by side contact with each other and having material carrying cavities in their contacting faces, a plurality of pulleys between which the belts extend, and an upwardly movable wedge element positioned underneath the belts and adapted upon upward movement to enter between and separate the belts for discharge of contained material.

10. A conveying mechanism comprising a pair of rubber-like belts adapted to travel in face to face side by side contact with each other and having material carrying cavities in their contacting faces, a plurality of pulleys between which the belts extend, and an upwardly movable freely rotatable disc of wedge shaped cross section positioned underneath the belts and adapted upon upward movement to enter between and separate the belts for discharge of contained material.

11. A conveying mechanism comprising a pair of rubber-like belts adapted to travel in face to face side by side contact with each other and having material carrying cavities in their contacting faces, a plurality of pulleys between which the belts extend, and movable means adapted to be inserted between the belts for discharge of contained material.

12. A rubber conveying belt of substantially convex form on one side and substantially concave form on the opposite side, said belt being formed of two grades of rubber, one grade of rubber being substantially soft and constituting the edge portions of the belt and the other grade of rubber tougher and forming the intermediate portion of the belt between the softer edge portions.

13. A rubber conveying belt of substantially convex form on one side and substantially concave form on the opposite side, said belt being formed of two grades of rubber, one grade of rubber being substantially soft and constituting the edge portions of the belt and the other grade of rubber tougher and forming the intermediate portion of the belt between the softer edge portions, and a rib extending longitudinally of the belt and protruding therefrom substantially centrally of the convex face.

14. A rubber conveying belt of substantially convex form on one side and substantially concave form on the opposite side, said belt being formed of two grades of rubber, one grade of rubber being substantially soft and constituting the edge portions of the belt and the other grade of rubber tougher and forming the intermediate portion of the belt between the softer edge portions, a rib extending longitudinally of the belt and protruding therefrom substantially centrally of the convex face, and a substantially non-stretchable core embedded in the ribbed portion of the belt.

15. A conveying mechanism comprising a pair of rubber-like belts running face to face and having material carrying cavities in their contacting faces, interlocking tongue and groove joint formed in the contacting faces of the belts between the cavities and the belt edges, the tongues being of greater width intermediately of their heights than at their roots and the grooves of greater width intermediately of their depths than at their entrances, and a pulley over which one belt is stretched before making contact with the other belt whereby the stretching contracts the belt tongue in width and expands the belt groove in width at its entrance so that interengagement with the tongues and grooves of the other belts is effected.

16. A conveying mechanism comprising a plurality of spaced apart pulleys, a moving tube of substantially round cross section supported by the pulleys and having a longitudinal slit therein, and an upwardly moveable wedge element positioned underneath the tube and adapted upon movement to enter and open the slit for discharge of contained material.

17. A conveying mechanism comprising a plurality of spaced apart pulleys, a moving tube of substantially round cross section supported by the pulleys and having a longitudinal slit therein, said tube being twisted into rope-like form between the pulleys.

18. In a conveyor, the combination with a pair of upper and lower conveyor belts running face to face and a pulley around which the belts extend in changing direction, of means contacting the belts before they reach the change of direction pulley and twisting the belts transversely so that they both ride side by side around and in contact with the change of direction pulley.

19. In a conveyor, the combination with a pair of upper and lower grooved conveyor belts running face to face and a pulley around which the belts extend in changing direction, of a series of secondary pulleys contacting the belts before they reach the change of direction pulley and twisting the belts transversely a quarter of a turn so that they both ride side by side around and in contact with the change of direction pulley.

20. In a conveyor, a plurality of pulleys, a belt of flexible material extending from pulley to pulley and having a material-carrying groove in one face thereof and extending in the direction of its movement, and a second belt of flexible material travelling in contact with the first belt between pulleys and extending along and across its grooved face to form a closure for the groove.

21. In a conveyor, a plurality of pulleys, a belt of flexible material extending from pulley to pulley and having a material-carrying groove of substantially concave cross section in one face thereof, and a second belt of flexible material travelling in contact with the first belt between pulleys and extending along and across its grooved face to form a closure for the groove.

22. In a conveyor, a plurality of pulleys, a belt of flexible material extending from pulley to pulley and having a material carrying indentation in one face thereof, and a second belt of flexible material travelling in contact with the first belt between pulleys and extending over the indentation to form a closure therefor.

23. In a conveyor, a plurality of pulleys, a belt of flexible material extending from pulley to pulley and having a material-carrying indentation in one face thereof, and a second belt of flexible material travelling in contact with the indented face of the first belt between pulleys and also having an indentation therein complementary to the indentation in the first belt.

24. In a conveyor, a plurality of pulleys, a belt of flexible material extending from pulley to pulley and having a material-carrying groove in one face thereof and extending in the direction of its movement, and a second belt of flexible material lying along and travelling in contact with the first belt between pulleys and having a groove in its contacting face complementary to the groove in the first belt.

25. In a conveyor, a plurality of pulleys, a belt of flexible material extending from pulley to pulley and having a material-carrying groove of substantially concave cross section in one face thereof and extending in the direction of its movement, and a second belt of flexible material lying along and travelling in contact with the first belt between pulleys and having a groove of substantially concave cross section in its contacting face complementary to the groove in the first belt.

26. A conveying mechanism comprising a plurality of pulleys, a pair of belts of pliable material flexible in all directions along their length and adapted to mutually travel in contact with each other between the pulleys and having material carrying cavities in their contacting faces.

27. A conveying mechanism comprising a plurality of pulleys, a pair of belts of pliable material flexible in all directions along their length and adapted to mutually travel in contact with each other between pulleys and having grooves in their contacting faces whereby a moving tube is formed.

28. A conveying mechanism comprising a pair of belts of pliable material flexible in all directions along their length and in contact with each other and having grooves in their contacting faces whereby a moving tube is formed, and spaced apart partitions contained within the tube to form stops against sliding of contained material.

29. A conveying mechanism comprising a pair of belts of pliable material flexible in all directions along their length and adapted to mutually travel in contact with each other and having material carrying cavities in their contacting faces, and spaced apart pulleys between which the belts mutually run and by which the belts are retained in their face to face relation.

30. A conveying mechanism comprising a pair of belts of pliable material flexible in all directions along their length and in contact with each other and having grooves in their contacting faces whereby a moving tube is formed, and spaced apart grooved pulleys between which the belts mutually run and by which the belts are retained in their face to face relation.

31. A conveying mechanism comprising a plurality of pulleys positioned in pairs with their axes substantially parallel, a pair of belts of pliable material supported by the pulleys and mutually running in contact therebetween, the belts having material carrying grooves in their contacting faces whereby a moving tube is formed.

32. A conveying mechanism comprising a material feeding element, an endless conveyor belt having a groove in its outer face positioned to receive material from the feeding element and extending to the delivery end of the mechanism, a second belt having a groove in its outer face and lying in contact with the first belt exteriorly of the material feeding element so that the grooves in the belts are complementary whereby a moving material-carrying passage-way is formed, and spaced apart partitions carried in the passage-way to form stops against sliding of contained material along the grooves.

33. A conveying mechanism comprising a pair of twisted belts of pliable material flexible in all directions along their length and adapted to travel in contact with each other and having material carrying cavities in their contacting faces, and a plurality of pulleys between which the twisted belts mutually extend.

34. A conveying mechanism comprising a pair of twisted belts of pliable material flexible in all directions along their length and adapted to travel in contact with each other and having material carrying cavities in their contacting faces, and spaced apart pulleys between which the twisted belts mutually run and by which the belts are retained in their face to face relation.

35. A conveying mechanism comprising a material feeding element, a plurality of pulleys, an endless conveyor belt extending between and supported by some of the pulleys and having a groove in its outer face positioned to receive material from the feeding element and extending to the delivery end of the mechanism, and a second belt extending to the delivery end of the mechanism and supported by other of the pulleys, said belt extending in contact with the grooved face of the first belt between pulleys and exteriorly of the material feeding element.

36. In a conveyor, a plurality of pulleys, a belt of flexible material extending from pulley to pulley and having a material-carrying groove in one face thereof and extending in the direction of its movement, and a second belt of flexible material travelling in contact with the first belt between pulleys and extending along and across its grooved face to form a closure for the groove, said belts mutually extending at least partially around one pulley in changing the direction of their movement.

37. In a conveyor, a plurality of pulleys, a belt of flexible material extending from pulley to pulley and having a material-carrying indentation in one face thereof, and a second belt of flexible material travelling in contact with the first belt between pulleys and extending over the indentation to form a closure therefor, said belts mutually extending at least partially around one pulley in changing the direction of their movement.

38. In a conveyor, a plurality of pulleys, a belt of flexible material extending from pulley to pulley and having a material-carrying groove in one face thereof and extending in the direction of its movement, and a second belt of flexible material lying along and travelling in contact with the first belt between pulleys and having a groove in its contacting face complementary to the groove in the first belt, said belts mutually extending at least partially around one pulley in changing the direction of their movement.

39. In a conveying mechanism, the combination with a longitudinally slitted moving pre-formed rubber-like tube having a material carrying bore and a plurality of pulleys supporting the tube and between which the tube extends, of a pair of flange elements extending radially from each pulley to form a tube contacting and receiving groove which retains the tube against transverse distortion, means formed on the tube and engaging the groove for retaining the tube in alignment in the groove, and a plurality of transverse partitions provided in the bore of the tube to retain contained material against slippage.

40. A rubber-like conveyor belt of substantially semi-circular cross section and having a pre-formed material carrying cavity in one face thereof, three substantially equi-distantly spaced apart ribs radially protruding from the convex face of the belt and running longitudinally thereof, two of the ribs being positioned at the edges of the belt, the other rib being positioned substantially centrally of the convex face of the belt, and a substantially non-stretchable core element embedded partially in the belt and partially in the centrally positioned rib.

HENRY STINSON JOHNS.